(12) United States Patent
Iotti

(10) Patent No.: US 7,009,361 B2
(45) Date of Patent: Mar. 7, 2006

(54) PROCESS FOR MEASURING THE SPEED OF AN INDUCTION MOTOR FROM NULL APPLIED FREQUENCY STATUS

(75) Inventor: Maurizio Iotti, Bagnolo In Piano (IT)

(73) Assignee: Zapi S.p.A., Reggio Emilia (IT)

( * ) Notice: Subject to any disclaimer, the term of this patent is extended or adjusted under 35 U.S.C. 154(b) by 0 days.

(21) Appl. No.: 10/726,250

(22) Filed: Dec. 1, 2003

(65) Prior Publication Data

US 2004/0108830 A1    Jun. 10, 2004

(30) Foreign Application Priority Data

Dec. 3, 2002    (IT)    .......................... PR2002A0074

(51) Int. Cl.
*H02P 5/28*    (2006.01)
(52) U.S. Cl. .................. 318/799; 318/807; 318/798
(58) Field of Classification Search .............. 318/799, 318/807, 798, 803, 802, 808, 812
See application file for complete search history.

(56) References Cited

U.S. PATENT DOCUMENTS

| | | | | |
|---|---|---|---|---|
| 4,532,464 A | * | 7/1985 | Igarashi et al. | 318/807 |
| 5,811,957 A | * | 9/1998 | Bose et al. | 318/802 |

* cited by examiner

*Primary Examiner*—Karen Masih
(74) *Attorney, Agent, or Firm*—Shlesinger & Fitzsimmons; Philip K. Fitzsimmons; David E. Henn

(57) ABSTRACT

Sensorless control of an induction motor, such as for electric vehicles, in which the speed of an induction motor is determined without encoders or other shaft transducers. When the applied frequency is null, the injection of a triad of direct currents in the stator phases supplies a stationing torque that is opposed to motion. The maximum stationing torque depends on the injected current width. It can be too low, such as if the vehicle is loaded and/or on a grade, or too high if the vehicle is on a plane. With embodiments, one can monitor, at defined time intervals, the speed of the vehicle when the applied frequency is null and with which such dichotomy can be solved. Embodiments can be applied generally to every occurrence of vehicle control loss in order to carry out its efficient recovery in line.

7 Claims, 5 Drawing Sheets

PROCESS FOR MEASURING THE SPEED OF AN INDUCTION MOTOR FROM NULL APPLIED FREQUENCY STATUS

Object of the present invention is a process for measuring the speed of an induction motor when the applied frequency is null in a control of the Sensorless type.

The application type to which the process is usefully applied regards all uses in which the load is able to turn the motor moving meanwhile the control is released.

The terms "control is released" mean the zeroing of every current in stator phases. The main (but not only) application to which reference will be made is the traction of an electric vehicle on steep paths: abandoning the vehicle on a ramp, with released accelerator, a torque is produced that tends to drag the vehicle along the descent. When a vehicle or car is dealt with, this will mean the one handled by the motor.

The definition null applied frequency means any situation in which a non-null triad of direct currents is applied to stator phases to produce a non-null current phasor (herein below called stationing phasor or stationing current) whose spatial orientation is fixed and could be any one within the electric 360° range.

Sensorless control methods are known for induction motors based on the estimation of magnetic flux components.

It is also known that, under the null applied frequency status, said methods fail due to the zeroing of electromotive forces in stator phases from whose measure the flux components are obtained.

The difficulties in measuring the flux with null applied frequency can be ignored if a speed measure is available as an alternative. The herein below described idea is a process for measuring the vehicle speed starting from the null applied frequency status.

The null applied frequency status supplies in the motor a torque that opposes the motion (stationing torque Tstand). This stationing torque will be useful for preventing the free vehicle rotation once having ended any deceleration manoeuvre towards the vehicle stop. Invariably, zero deceleration operations of the vehicle will end with the application of a stationing phasor. If the vehicle is on a descent path, the stationing phasor will not completely stop it, but will brake its descent according to the herein below described mode. By providing the general expression of the Torque (2.9) in case of null applied frequency, for Tstand an expression is found whose qualitative behaviour (as function of electric motor speed $\omega r$ and for two different widths of the stationing phasor Idc), is shown on the curve in FIG. 2 and refers to a Motor with Rated Power Pn=1250 W, Vphase=16Veff, a corner frequency fc=75 Hz and Rotor Time Constant Tr=62 msec.

It can be demonstrated, and it is also pointed out in FIG. 2, that at low speeds the stationing torque is proportional to the product between speed ($\omega r$) and square of stationing phasor width.

It can further be seen that, for a load torque less than Tsmax (maximum stationing torque), the vehicle will be braked and its descent will occur at a low and controlled speed (it can be demonstrated that it will be $\omega r < 1/Tr$: in the example shown, $\omega r < 1/Tr = 2\pi 2.6$ Hz).

If the dragging torque towards the descent exceeded Tsmax, the working point would go into the torque collapsed range with consequent uncontrolled vehicle acceleration along the descent.

If there is an Encoder on the motor shaft, this difficulty is easily solved by increasing the control frequency and limiting the slip in the motor at values that are able to guarantee everywhere the production of the maximum torque.

In a Sensorless control, it is rather obvious to use a management of the feedforward type (i.e open loop) for the stationing torque: it will be convenient to apply an high stationing phasor width (at least as much high as the motor saturates), in order to minimise the risk the load exceeds the maximum torque (Tsmax).

Since, under operating conditions, the vehicle will mainly travel on plane courses and with partial loads, the application of high stationing currents will bring about very high energy wastes as inconvenience.

It must be added that, due to the incapability of measuring the magnetic flux in the machine, it will not be possible to estimate the actual stationing torque that would allow cancelling the currents if superfluous.

Object of the present invention is therefore providing a process for deciding whether the stationing current phasor is useful and adequate. An intervention mode will then be discussed in one case or the other.

This object is fully obtained in the process for measuring the motor speed starting from an applied null frequency status, object of the present invention, that is characterised by what is included in the below listed claims and in particular in that it allows activating a motor speed monitoring function by overlapping in stator phases a particular sampling signal (a step transition of the stationing phasor) and the measure of produced effects.

The process will now be shown, merely as a non-limiting example, with reference to the enclosed drawings, in which.

The above process must be justified at theoretical level starting from the general dynamic model for an induction motor (from 2.1 to 2.9).

$$\phi qs = L_s iqs + L_m iQs \quad (2.1)$$

$$\phi ds = L_s ids + L_m iDs \quad (2.2)$$

$$\phi Qs = L_R iQs + L_m iqs \quad (2.3)$$

$$\phi Ds = L_R iDs + L_m ids \quad (2.4)$$

$$vqs = R_s iqs + d/dt \phi qs + \omega \phi ds \quad (2.5)$$

$$vds = R_s ids + d/dt \phi ds - \omega \phi qs \quad (2.6)$$

$$0 = R_R iQs + d/dt \phi Qs + \omega_R \phi Ds \quad (2.7)$$

$$0 = R_R iDs + d/dt \phi Ds - \omega_R \phi Qs \quad (2.8)$$

$$C_m = \frac{3}{2} p(iqs\ \varphi ds - ids\ \varphi qs) \quad (2.9)$$

Where:
- φqs, φds: stator flux components
- φQs, φDs: rotor flux components
- iqs, ids: stator current components
- iQs, iDs: rotor current components
- vqs, vds: stator voltage components
- ω: electric rotation angular speed of the reference system with respect to the stator
- $\omega_R$: electric rotation angular speed of the reference system with respect to the rotor ($\omega_R = \omega - \omega r$), with ωr electric rotor angular speed
- ωr: (electric) rotor angular speed ωr=pΩr
- Ωr: rotor shaft speed
- p: poles pair number
- Ls: stator inductance
- Rs: stator resistance
- Lm: magnetization inductance
- Lr: rotor inductance
- Rr: rotor resistance
- Tr: rotor time constant Lr/Rr
- (2.9) is the general expression of the instantaneous torque developed by the motor.

For an obvious analysis simplification, and without affecting its generality, reference has been made to the equivalent two-phase model of the three-phase motor, which is obtained through the well-known Clarke transform (3.1, 3.2).

$$\begin{bmatrix} iqs \\ ids \end{bmatrix} = D \cdot \begin{bmatrix} ias \\ ibs \end{bmatrix} \quad \text{With} \quad D = \begin{bmatrix} \frac{1}{\sqrt{3}} & \frac{2}{\sqrt{3}} \\ 1 & 0 \end{bmatrix} \quad (3.1)$$

and vice versa $$\begin{bmatrix} ias \\ ibs \end{bmatrix} = D^{-1} \begin{bmatrix} iqs \\ ids \end{bmatrix} \quad \text{With} \quad D^{-1} = \begin{bmatrix} 0 & 1 \\ \frac{\sqrt{3}}{2} & -\frac{1}{2} \end{bmatrix} \quad (3.2)$$

Where:
- iqs, ids: quadrature and direct components of the stator current phasor in the equivalent two-phase system whose axis ds is along the as direction. ias, ibs: currents in phases as and bs of the three-phase motor.

Figure 1:
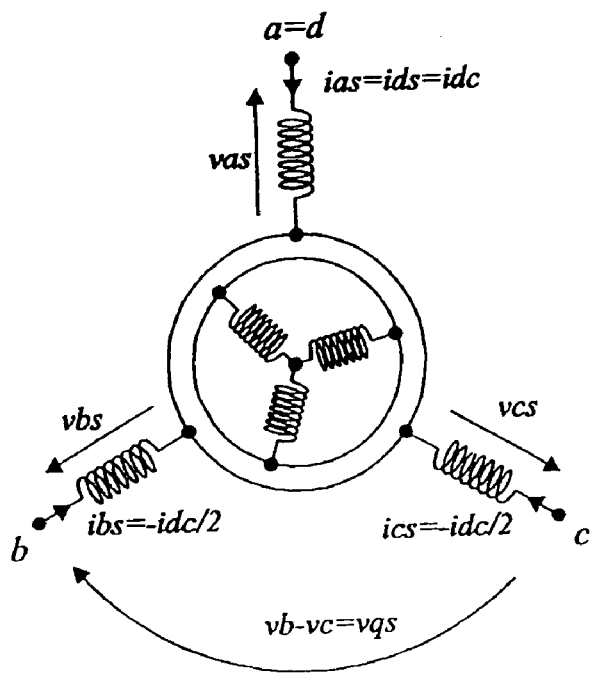
FIG. 1 shows a particular configuration of the applied null frequency status, characterised by injecting a current idc in phase a and by extracting two currents idc/2 from phases b and c.
Figure 2:
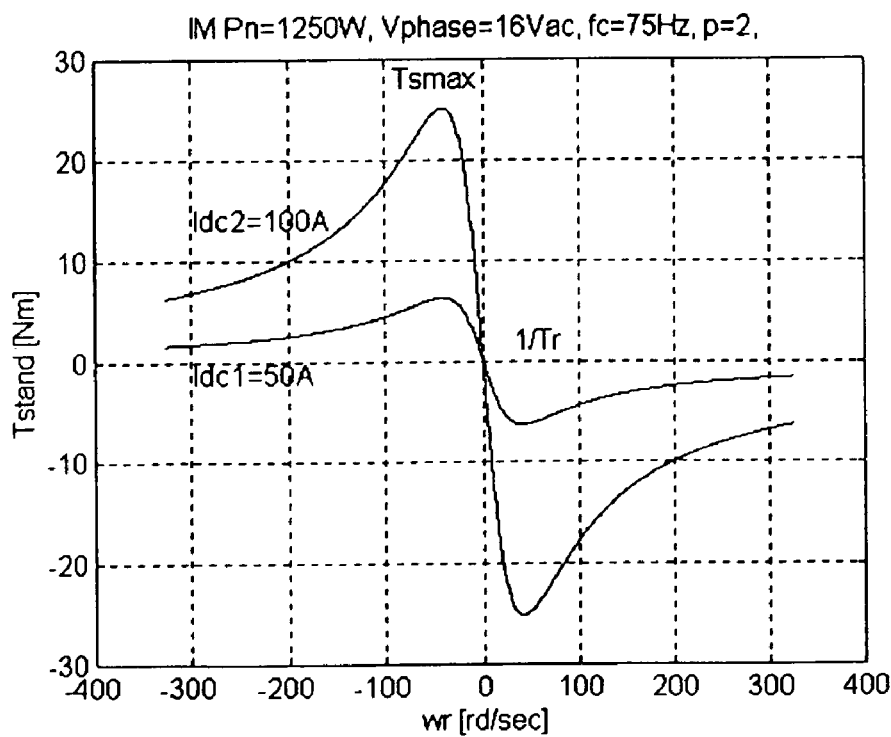
FIG. 2 shows the behaviour of the stationing torque Tstand depending on motor speed $\omega r$ and when the stationing phasor width (idc) changes. The curve refers to a simulation for a motor with Pn=1250 W Vphase=16Vac fc=75 Hz p=2 Tr=62 msec.

For our purposes, it is interesting to note how the general dynamic representation (from 2.1 to 2.8) is modified when applying a stator current phasor fixed in space. To simplify the analysis, without affecting its generality, such phasor will be identified with a three-phase triad composed of a current idc entering phase a and two currents idc/2 going out of phases b and c (FIG. 1). Such current (idc) will be considered time depending.

By applying the Clarke transforming formulae (3.1) to the thereby defined triad, the equivalent two-phase model components are obtained.
- ids=idc
- iqs=0

By replacing iqs and ids with their values, the general dynamic model (from 2.1 to 2.8) for the null frequency status (ω=0) is simplified into:

$$\phi qs = L_m iQs \quad (4.1)$$

$$\phi ds = L_s ids + L_m iDs \quad (4.2)$$

$$\phi Qs = L_R iQs \quad (4.3)$$

$$\phi Ds = L_R iDs + L_m ids \quad (4.4)$$

$$vqs = d/dt \phi qs \quad (4.5)$$

$$vds = R_s ids + d/dt \phi ds \quad (4.6)$$

$$0 = R_R iQs + d/dt \phi Qs - \omega r \phi Ds \quad (4.7)$$

$$0 = R_R iDs + d/dt \phi Ds + \omega r \phi Qs \quad (4.8)$$

$$C_m = -\frac{3}{2} p\ ids\ \varphi qs \quad (4.9)$$

By processing the above model (from 4.1 to 4.8), a linear second-order differential equation is obtained, that expresses the functional dependency of quadrature voltage (vqs) from current ids in direct phase (ids=idc) with iqs=0:

$$\frac{1}{\omega r}\frac{d vqs}{dt} + \frac{2}{\omega r Tr}vqs + \frac{1+\omega r^2 Tr^2}{\omega r Tr^2}\left[\varphi qs(0+) + \int_0^t vqs(t)dt\right] = \frac{RrLm^2}{Lr^2}ids \quad (5)$$

To complete, the similar functional relationship vds=f(ids) could be determined. Its analysis however will be more complex and worsely readable. Therefore, only relationship (5) will be studied.

Transforming relationship (5) from zero-state, namely from null initial conditions (vqs(0+)=0, φqs(0+)=0), the representation (6) in the Laplace domain is obtained:

$$Vqs(s) = \frac{\omega r Lm^2}{RrTr^2} \frac{s}{(s+1/Tr)^2 + \omega r^2} Ids(s) \quad (6)$$

Relationship (6) manages the reply (vqs) of our motor to the application of any current ids(t) (provided that it is null ∀t<0) at iqs=0.

In particular, it is interesting to study the effect on vqs of the step transition of ids(t).

In order to point out how the present measuring procedure can be repeated after a short time without necessarily starting from zero-state, we will in practice analyse a double step transition of ids (t).

We will apply a first step by going from zero to value Idc0 at time t0=0; afterwards, we will move towards the final value Idc1 applied at time t=t1. The ids transform then becomes:

$$Ids(s) = \frac{Idc0}{s} + \frac{Idc1 - Idc0}{s} e^{-st1} \quad (7)$$

By replacing (7) in transfer function (6) and by antitransforming, the expression in the time domain of the response (vqs) to the step transition of ids will be obtained:

$$vqs(t) = \begin{cases} 0 & \forall t < 0 \\ \frac{Lm^2 Idc0}{RrTr^2} e^{-\frac{t}{Tr}} sen\,\omega rt & \forall 0 < t < t1 \\ \frac{Lm^2 Idc0}{RrTr^2} e^{-\frac{t}{Tr}} sen\,\omega rt + \\ \quad \frac{Lm^2(Idc1 - Idc0)}{RrTr^2} e^{-\frac{t-t1}{Tr}} sen\,\omega r(t-t1) & \forall t > t1 \end{cases} \quad (8)$$

The second line of (8) is the initial step response with which ids transits from 0 to Idc0. The third line of (8) provides the response to the following step with which, at time t1, ids moves from Idc0 to Idc1.

Figure 3:
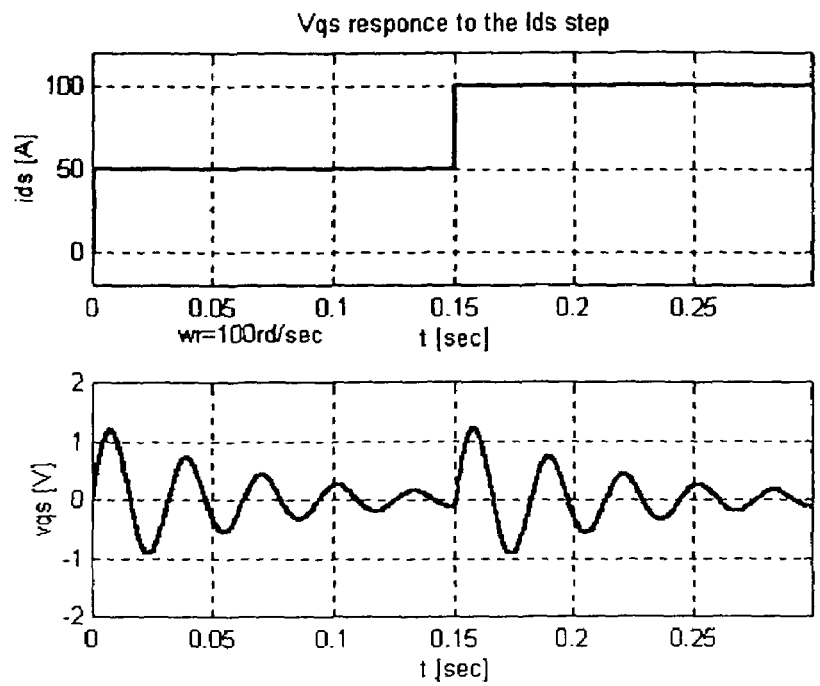
FIG. 3 shows the effects of a double step transition of the stationing current phasor (ids=idc from 0 to 50 Adc and afterwards to 100 Adc) on quadrature voltage (vqs); it is the result of a simulation involving the same motor as above, rotating at an electric speed $\omega r$=100 rd/sec.

In both cases, vqs reacts with a dampened oscillation at a frequency equal to electric rotor speed (ωr) and enveloped by an exponential with time constant τ=Tr (FIG. 3).

It can further be seen how the transient following the first step transition of ids is already exhausting at time ti and the vqs response for the following transition from Idc0 to 2Idc0 resembles the previous one though the starting state it not the initial zero-state any more. It will then be enough to store a fixed value of ids(t)=Idc0 for a duration corresponding to some rotor time constants (in the example a bit more than two) to restore a new steady-state configuration of the pair vqs, φqs that is suitable for a new step transition of ids; and this without necessarily passing from the zero-state.

Such initial state, compatible with the application of the present process, can be generalised in the one for which vqs is simply zeroed (while flux φqs can assume any value, not necessarily null) and it is easy to check that it is restored as steady-state solution of every previous step transition of ids. Relationship (8) can further be simplified by approximating the Lm/Lr ratio to unit:

$$vqs(t) \cong \begin{cases} 0 & \forall t < 0 \\ RrIdc0\,e^{-\frac{t}{Tr}} sen\,\omega rt & \forall 0 < t < t1 \\ RrIdc0\,e^{-\frac{t}{Tr}} sen\,\omega rt + \\ \quad Rr(Idc1 - Idc0)e^{-\frac{t-t1}{Tr}} sen\,\omega r(t-t1) & \forall t > t1 \end{cases} \quad (9)$$

Relationship (9) points out the extreme readability of response (vqs) to the step transition of ids. In particular:

- the starting width of vqs envelope (RrΔIdc) does not depend (or depends very little) on speed (ωr), on slip (ωslip), on machine saturation level (namely on magnetic flux Φ).
- the starting width of vqs envelope (RrΔIdc) depends only on the discontinuity amount on ids and on rotor resistance.

It follows that the potential width of the useful signal does not change with operating motor conditions. Only at low speed, the meaningful Vqs lobes will reach their maximum when the exponential envelope will already be degraded. Speeds can therefore be measured starting from an order of magnitude comparable with the rotor time constant inverse (½ πTr=few hertz) and over.

Figure 4:
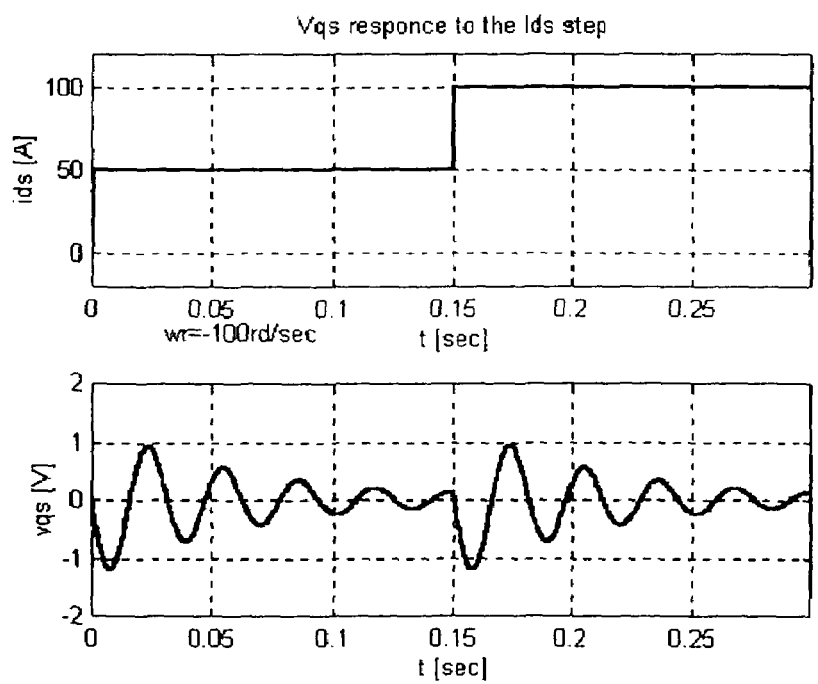
FIG. 4 shows the effects of a double step transition of the stationing current phasor (ids=idc from 0 to 50 Adc and afterwards to 100 Adc) on quadrature voltage (vqs); it is the result of a simulation involving the same motor as above, rotating at an electric speed $\omega r$=−100 rd/sec.

Moreover, it can be seen from (9) that, if speed direction is reversed, also the first vqs lobe of the step response has an inverted sign (FIG. 4).

Figure 5:
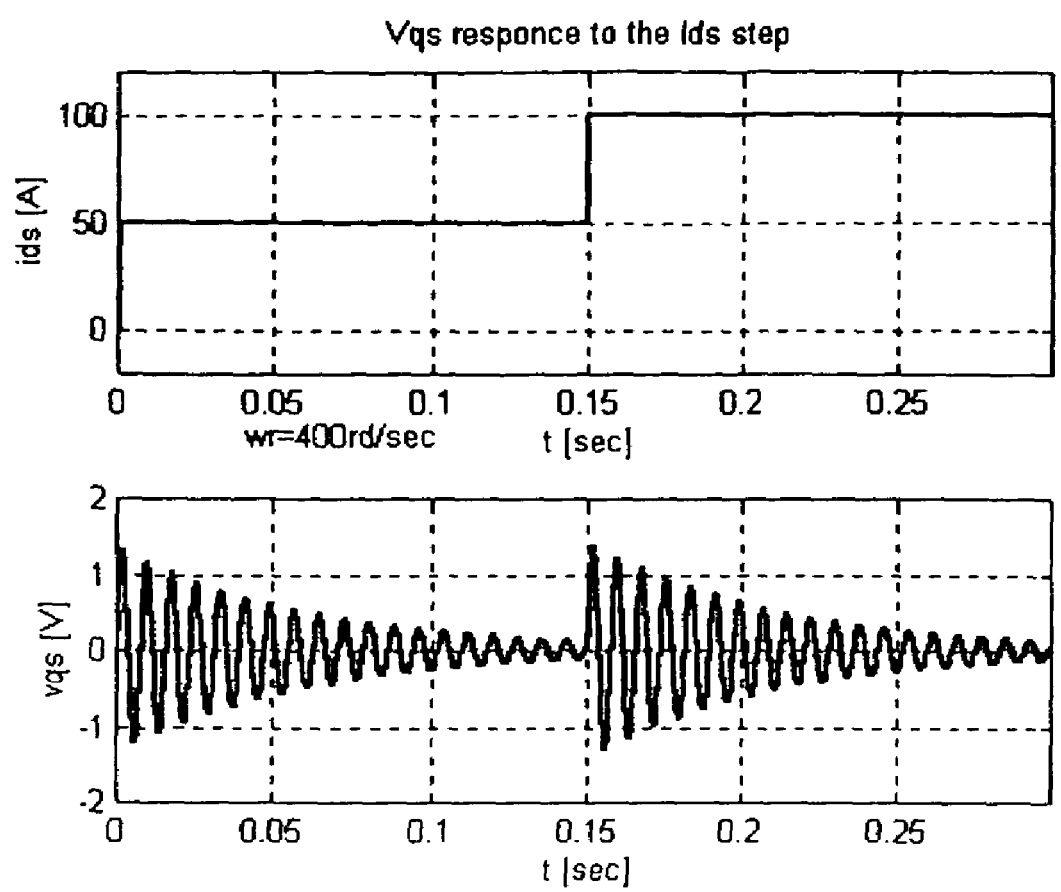
FIG. 5 shows the effects of a double step transition of the stationing current phasor (ids=idc from 0 to 50 Adc and afterwards to 100 Adc) on quadrature voltage (vqs); it is the result of a simulation involving the same motor as above, rotating at an electric speed $\omega r$=400 rd/sec.

From the vqs signal analysis, effect of the step modification of ids, the electric rotor speed measure (with sign) can be obtained as inverse of period T of the sinusoid enveloped by the exponential (ωr=2 π/T). See FIG. 3, FIG. 4, FIG. 5.

The described analysis, referring to a two-phase model, must be generalised by examining four of its aspects in more detail:

The first current level (Idc0) can be interpreted as the one corresponding to the stationing phasor proper that afterwards is made temporarily transit towards a different width (Idc1) to induce effects documented on vqs. It is as well obvious that also the new current level (as a not necessarily undesired consequence) will produce its own stationing torque value.

The same results can be immediately applied to a three-phase motor (applying the Clark transform (3.1)). In this context the transition effect on the stationing current will have to be monitored on the triangle linked voltage vqs=vbc=vbs−vcs (FIG. 1).

If it is still not clear, the step modification of the stationing current ids must be meant as instantaneous transition between two different levels of any direct current; the transition from one direct current level to zero is only its more intuitive particular case. The width of the step transition establishes the amount of the effect produced on vqs.

A simplified approach has been proposed that identifies the stationing and stimulus current with ids=ias and the effects with the behaviour of vqs=vb−vc (FIG. 1). It will be justified how this is not a limit to generality. Let us see it.

The scalar components of the two-phase representation, that so far have been identified with the electric quantities values in motor phases, in a wider interpretation represent the projections of space phasors produced by the motor on any two-phase reference system and whose axes are not necessarily overlapped to stator phase orientations.

Therefore, axis d can always be identified with the stationing phasor orientation and axis q with the direction in quadrature thereto whichever they are (namely, the configuration in FIG. 1 with ids=ias=Idc and iqs=0 is only a particular, not a constraining choice for orienting the stationing phasor).

This and other results will more easily be understood from the following description of a preferred, but not exclusive embodiment, shown merely as a non-limiting example in the text that follows.

The above described measuring process has been really implemented on a three-phase induction motor with Pn=1250 W p=2 poles pair Vphase=16V corner frequency fc=75 Hz Tr=63 msec. Using a microprocessor power inverter, a stationing current of Idc=100 A has been injected in the configuration described in FIG. 1 (Idc entering in a and Idc/2 going out of b and c). The motor rotor has been forced to move at a known speed ωr=−100 rd/sec.

Figure 6:
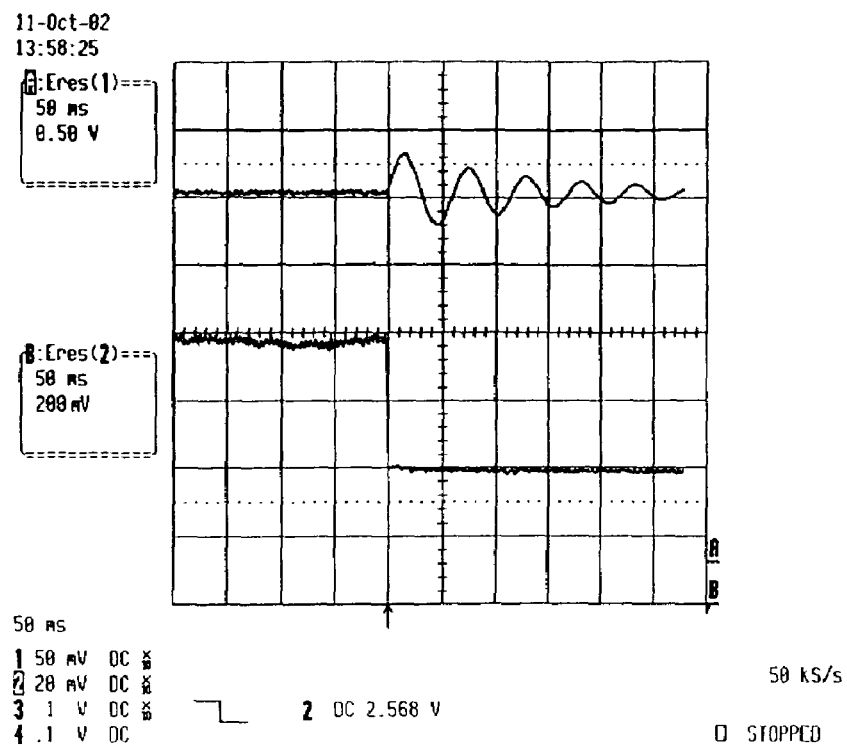
FIG. 6 shows the oscilloscope response of a real motor (Pn=1250 W wound for Vfase=16Vac fc=75 Hz and rotating at a speed of $\omega r$=−100 rd/sec) at a step transition of idc from 100 Adc to 0; the upper trace is vb−vc (2V/div); the lower trace is the stimulus and stationing current ias=idc (50 A/div).
Figure 7:
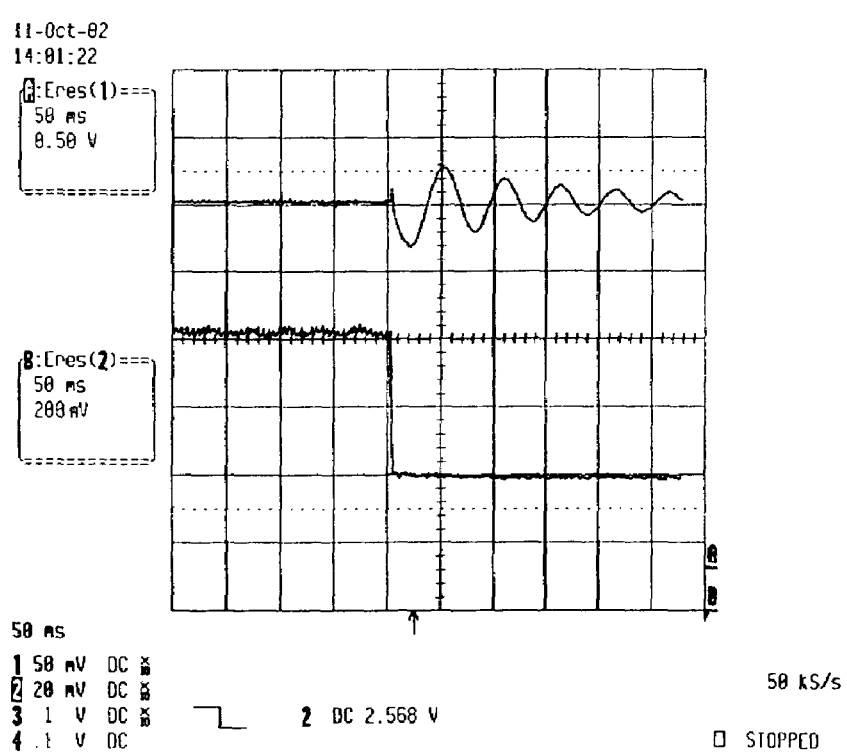
FIG. 7 shows the response of the same motor in FIG. 6 (rotating at a speed of $\omega r$=100 rd/sec) at a step transition of idc from 100 Adc to 0.
Figure 8:
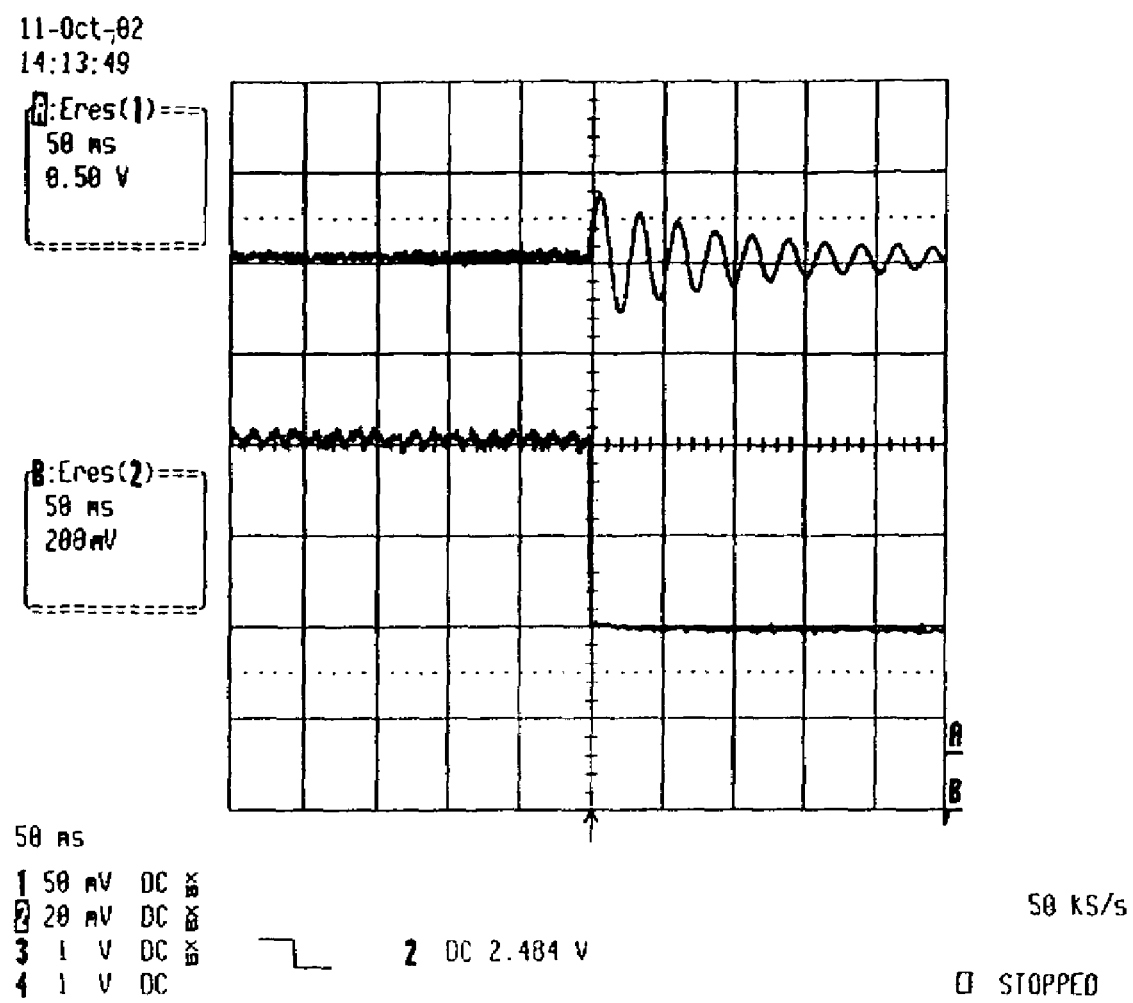
FIG. 8 shows the response of the same motor in FIG. 6 (rotating at a speed of $\omega$=−240 rd/sec) at the step transition of idc from 100 Adc to 0.

The sudden stationing current interruption stimulates in the motor, according to the above described theory, a concatenated voltage vqs=vb−vc shown in FIG. 6. The periodicity measure of this voltage, following the step application, provides the searched speed information. The first lobe (main lobe) sign after the ids transition to 0 provides the speed sign.

The modes for determining the vqs period and the main lobe sign can be several. In the current embodiment, and merely as a non-limiting example, the following measuring dynamics has been chosen.

A quick processing unit (microcontroller) checks the injection level of the stationing current (Idc) and takes care of suddenly interrupting the current by opening the inverter half bridges. This operation approximates in a simple way a step transition of a stationing phasor. The sudden opening of power devices implies a very short transient in which the stator currents, sustained only by stator leakage inductances (Ls-Lm), discharge their energy, through inverter freewheeling diodes, on the supply line (in this case a 24V battery).

Immediately after the stator currents reset, at a 125 μs interrupt, vqs=vb−vc is read. Every reading is numbered with an increasing index and its absolute value is compared with the relative maximum previously determined, having the same sign. The width of the greater of the two compared elements (current sample and previous relative maximum) and the related index are stored in a continuous search for the absolute maximum. The same process is applied both to the search for a maximum for positive lobes and to the search for a maximum of negative lobes of vqs.

Reasonably, the process will end after a survey time that will have, as order of magnitude, the rotor time constant (Tr). After that, a stationing phasor can again be applied and it could be, for example, the same phasor preceding the measure or the same phasor used for measuring, waiting that the analysis result on vqs allows deciding about the adequacy and usefulness of the stationing phasor itself.

After the survey transient for the step response of vqs elapses, a positive maximum will have been stored with its succession number (index_p) together with a negative maximum with its succession number (index_n). The sinusoid period on vqs will then be computed as:

$$T = 2abs(\text{index}\_p - \text{index}\_n) 125 \mu s \quad (10)$$

from which:

$$abs(\omega r) = 2\pi/T$$

Moreover, if:

$$\text{index}\_p < \text{index}\_n \Rightarrow \omega r < 0$$

Instead, if:

$$\text{index}\_p > \text{index}\_n \Rightarrow \omega r > 0$$

After having computed ωr with related sign, it is decided whether the stationing current is enough or not. If the stationing current is enough (ωr close to 0), its proportional reduction can be carried out, at the same time performing further speed monitoring operations and till the final deletion of the current itself.

If, instead, the ωr measure detects a moving motor, a control recovery procedure will have to be carried out. Also for the recovery procedure, merely as a non-limiting information, an execution mode is provided.

After having measured the motor descent speed, the processing unit in a quick ramp will increase the frequency from zero to the value with sign of the detected speed (control re-tuning).

This frequency ramp can be carried out, for example, with a fixed width of the stator current. Once having tuned the frequency on the measured speed, the Sensorless control, that is able to control the motor at a non-zero frequency (line control), will be reactivated. The frequency will then be decreased at very low (not null) values to accompany the motor at very slow speed along the descent with line control and till a new travel request or until the torque produced in line is converted from braking torque to motive torque. (The torque estimating methods in an induction motor are known in literature.) This torque sign transition from braking torque to motive torque testifies that the descent is ended. Then, the frequency will be reduced to zero by applying the stationing current and restarting the timed monitoring procedure.

From what has been stated, the described process can be applied to a more general system re-tuning context (namely the application of a frequency that is next to the electric motor speed once known) every time a control loss occurs. A situation with a lack in the stationing torque along a descent is only a particular case of control loss. More generally, every time and for any reason the system goes to work with an inadequate slip (i.e. too high: for example due to a sudden deceleration due to an obstacle along the trajectory or following a start-up with running motor) with following motion torque collapse, the on line recovery procedure can be activated and exploits the herein described speed measuring and recovering process. A direct current phasor will be applied, then will be made step-transit towards a different value and the effects on stator voltages will be analysed.

Finally, it must be underlined that the above-described control recovery modes, must be deemed merely as a non-limiting example and the recognition criteria for a control loss status are outside the current scope but are known or can be easily determined if the applied frequency is not null.

What is claimed is:

1. A sensorless induction motor speed measuring method comprising operating the motor under an applied null frequency status, measuring electric effects on phase voltages induced by a step transition between two levels of a static stator current phasor and analyzing the electric effects to determine the rotor speed.

2. The method of claim 1 wherein, under a control loss status, the static stator current phasor passes from a frequency in which control has been lost to an applied null frequency status in which a stator current phasor unmoving in space is applied, and measuring electric effects further comprises exploiting a following step transition towards a different stator current phasor width.

3. The method of claim 1 further comprising placing an electric vehicle, actuated by an induction motor, on a grade, releasing an accelerator of the vehicle, and activating, upon an applied null frequency status, a cyclic check procedure of adequacy and usefulness of the stationing phasor versus time by repeatedly measuring motor speed.

4. The method of claim 3 further comprising degrading a stationing current with a small slope by cyclically verifying adequacy and usefulness of decreasing current levels by repeatedly measuring motor speed.

5. The method of claim 4 further comprising, when the stationing current results are not adequate, recovering motor control by applying a frequency that corresponds to the measured speed and decreases the frequency towards a low frequency value to accompany the motor along the descent.

6. The method of claim 5 further comprising going to an applied null frequency status when a sign of the torque developed during the low-frequency controlled descent goes from negative, corresponding to braking, to positive, corresponding to motive, at a descent end.

7. The method of claim 2 further comprising, when the induction motor is under a control loss status having high slip and low motion torques, recovering motor control by applying a frequency corresponding to the measured speed and then delivering control to a line algorithm, and modulating a re-tuning value frequency towards a value controlled by an accelerator.

* * * * *